UNITED STATES PATENT OFFICE.

VICTOR G. BLOEDE, OF BALTIMORE, MARYLAND, ASSIGNOR TO THE VICTOR G. BLOEDE COMPANY OF BALTIMORE CITY.

PROCESS OF DYEING.

SPECIFICATION forming part of Letters Patent No. 583,298, dated May 25, 1897.

Application filed May 21, 1891. Serial No. 393,622. (No specimens.)

*To all whom it may concern:*

Be it known that I, VICTOR G. BLOEDE, a citizen of the United States, and a resident of the city of Baltimore, in the State of Maryland, have invented a certain new and useful Process of Coloring and Improving the Finish and Durability of Yarns and Fabrics, of which the following is a specification.

This invention relates to certain improvements in and modifications of my process for finishing and coloring textile fabrics, described and claimed in Letters Patent No. 449,104, issued March 31, 1891, whereby better as well as quicker and more economical results are obtained on certain classes of goods.

In my original process the goods to be treated are impregnated or otherwise treated with a solution of starch or starch and coloring-matter and then passed through a solution of some substance that has the power of rendering the starch insoluble.

The object of my present invention is the same as that of the original method and the results obtained are similar, but the operations are shortened and simplified and a much more perfect reaction between the several materials is assured.

My improved process consists in adding to the starch to be used for the finishing or coloring of the yarns or fabrics certain substances that while in an acid or neutral condition will not curdle or render the starch insoluble, yet will produce this result upon withdrawal of the acid of combination. To give examples, chlorid of calcium or barium, peracetate of iron, or acetate of lead may be freely combined with starch not only without causing its precipitation or transformation into the insoluble state, but, on the contrary, will materially increase its solubility and penetrating power. If from such a soluble composition of starch and metallic or earthy salts all or a large portion of the acid of combination be withdrawn, either by means of an alkali or in any other manner, the starch is at once transformed into the insoluble condition.

In carrying out my invention in practice I combine with a starch paste or a mixture of starch paste and coloring-matter a sufficient quantity of chlorid of calcium, chlorid of barium, or a persalt of iron or any other compound whose base will form an insoluble combination with the starch, and having applied this mixture to the yarn or fabric I subject the latter to the action of an alkali until the acid has been withdrawn and the starch is reduced to an insoluble condition. In case an acetate has been used a prolonged steaming of the fiber or exposure to hot air will in some cases suffice to render the starch insoluble, but the use of an alkali is to be preferred.

I am aware that chlorid of calcium, chloride of zinc, chlorid of magnesia, and similar salts are frequently used in combination with starch for the purpose of making the starch more soluble. The essential element of my process and the difference between it and the simple mingling of the chemical salts with the starch consists in the further step of neutralizing the acid of combination, whereby the base of the salt is liberated and forms an insoluble combination with the starch.

Having thus described my invention, what I claim, and desire to secure by Letters Patent, is—

1. The herein-described process for improving the durability and permanency of the color or finish or both, of a yarn or fabric, by treating the yarn or fabric with starch containing a salt or salts, the base of which possesses the power of rendering the starch insoluble when the acid of combination is withdrawn, (salts of lime, barium, iron, lead, &c.) then rendering the starch insoluble by extracting part or all of the acid of combination by the application of an alkali or equivalent treatment.

2. The process herein described of finishing or coloring yarns or fabrics which consists of applying to or impregnating yarns and fabrics with a mixture of starch and coloring-matter and a salt, whose base has the power of rendering the starch insoluble when the acid of combination is withdrawn, (salts of lime, barium, iron, lead, &c.) then rendering the starch insoluble by the action of an alkali or equivalent treatment.

VICTOR G. BLOEDE.

Witnesses:
JEANNIE DEAN,
JOHN BROWN.